(12) United States Patent
Zeng et al.

(10) Patent No.: US 6,661,196 B1
(45) Date of Patent: Dec. 9, 2003

(54) CHARGER CONTACT

(75) Inventors: Quing-Hua "Lucy" Zeng, Alpharetta, GA (US); Charles William Friedli, Lawrenceville, GA (US); Douglas Arthur Vine, Suwanee, GA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/222,159

(22) Filed: Aug. 16, 2002

(51) Int. Cl.[7] ............................................. H01M 10/46
(52) U.S. Cl. ...................................................... 320/107
(58) Field of Search ................................. 320/107, 112, 320/113, 114, 115

(56) References Cited

U.S. PATENT DOCUMENTS

| | | | |
|---|---|---|---|
| 5,506,488 A | * | 4/1996 | Leiserson |
| 5,831,414 A | * | 11/1998 | Yokota et al. |
| 5,939,859 A | * | 8/1999 | Morita |
| 5,999,102 A | * | 12/1999 | Mitsul et al. |
| 6,204,631 B1 | * | 3/2001 | Kaiwa et al. |

* cited by examiner

*Primary Examiner*—Edward H. Tso
(74) *Attorney, Agent, or Firm*—Philip H. Burrus, IV

(57) ABSTRACT

This invention includes an electrically-conductive contact, preferably for use in battery chargers. The contact is manufactured from a springy metal material, like stainless steel. The contact includes a triangular shaped contour, capable of withstanding battery insertion force, and further capable of mating to battery contacts of varying depths. The contact includes a mechanical stop for preventing the contour from protruding too far through apertures in the battery charger pocket. A stem preloads the mechanical stop against a retaining wall. A lanced barb on a charger mount allows the contact to reside in the charger without the need of other adhesives, screws or rivets. A protrusion makes contact with an electrical pad on a printed circuit board. A protrusion extensor preloads the protrusion against the pad.

13 Claims, 6 Drawing Sheets

CHARGER CONTACT

BACKGROUND

1. Technical Field

This invention relates generally to battery chargers, and more specifically to an electrically-conductive metal contact for delivering power from a power source to a rechargeable battery.

2. Background Art

Battery chargers deliver power from a power source to a rechargeable battery cell. The popular way to connect the charger to the battery is by way of an electrically-conductive metal contact. Referring now to FIG. 1, illustrated therein is a typical prior art charger 100, as disclosed in U.S. Pat. No. D432,983. The charger 100, shown here in a top, plan view, includes a pocket 101 that has a set of spring-loaded electrical contacts 102. The contacts 102 project upward from the bottom of the pocket 101. When a portable electronic device or rechargeable battery is placed in the pocket, gravity pulls the device or battery against the contacts, thereby ensuring a proper electrical connection.

While this system works well for some portable electronic devices, it does not work well for all of them. For example, the large, industrial radios used by policemen and firemen generally do not have electrical contacts on their bases. The contacts are located on the side of the battery instead. Additionally, these batteries are often too large to lay on their sides to take advantage of the gravity-based system shown in FIG. 1.

To complicate matters further, these batteries often have recessed contacts, i.e. the contacts are sunken below the outer surface of the battery. The amount of recess varies from battery to battery. As a result of these issues, it is desirable to have a charger capable of charging a battery in a vertical position while accommodating battery contacts of varying recess depths.

One such solution is shown in FIG. 2. In FIG. 2, a battery charger 200 is shown with an electrical contact 202 disposed on the side of the pocket 206. To accommodate battery contacts of varying recess depths, the contact 202 has been spring loaded by way of a coiled spring 203 placed between the contact 202 and a mechanical stop 204. In this manner, the contact 202 is capable of protruding through the pocket wall 206 in varying amounts.

The problem with this prior art solution is that if the contact 202 protrudes far enough through the pocket wall 206 to make a sufficient electrical connection with a deeply recessed contact on a battery, the contact 202 may cause interference with a battery 201 when it is inserted into the charger 202. As shown in FIG. 2, the contact 202 interferes with battery insertion at point 205. Repeated interference with the contact 202 may cause the contact, and thus the charger, to fail.

There is thus a need for an improved contact system that accommodates sidewall connection to battery contacts of varying recess depths.

DETAILED DESCRIPTION OF THE INVENTION

Figure 1:
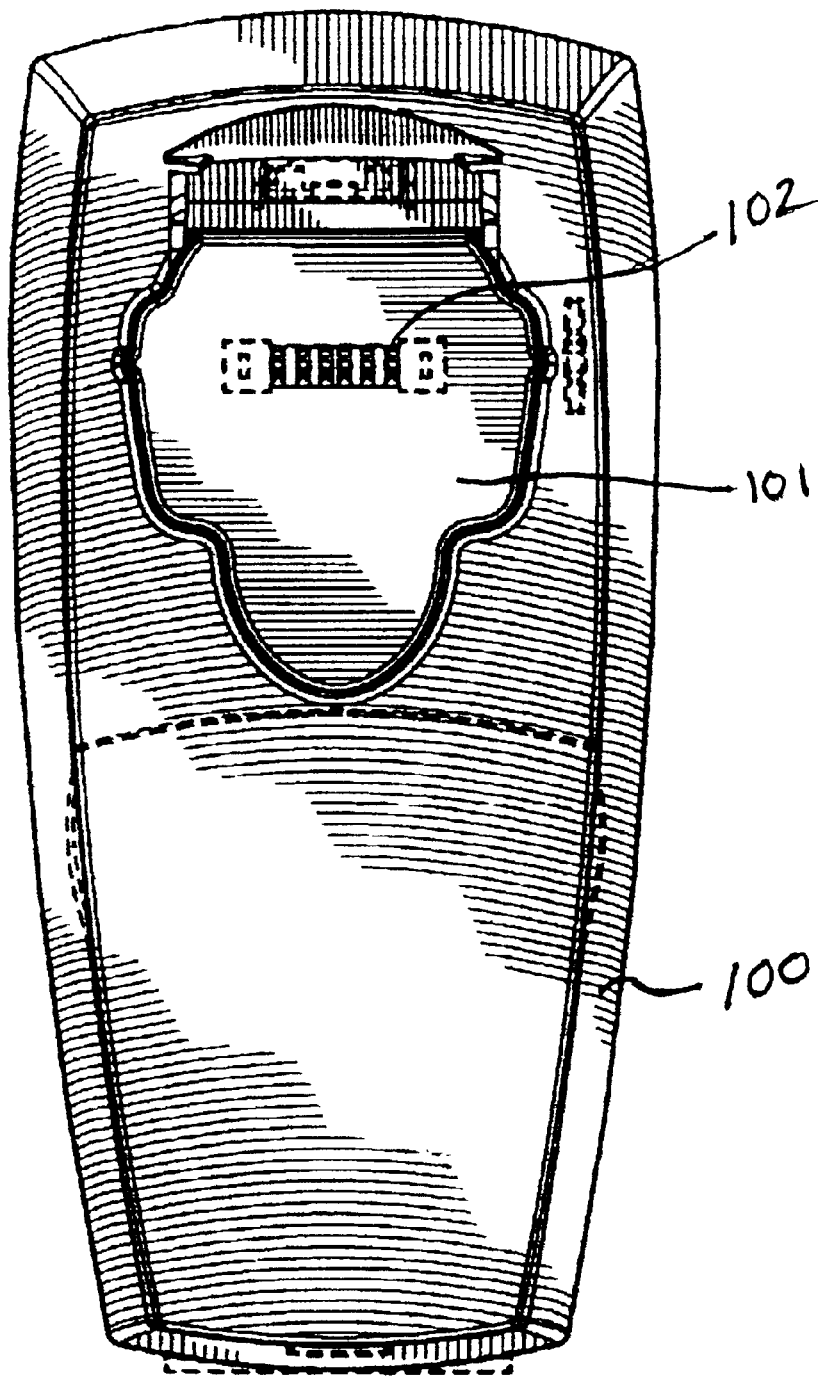
FIG. 1 is a prior art charger.
Figure 2:
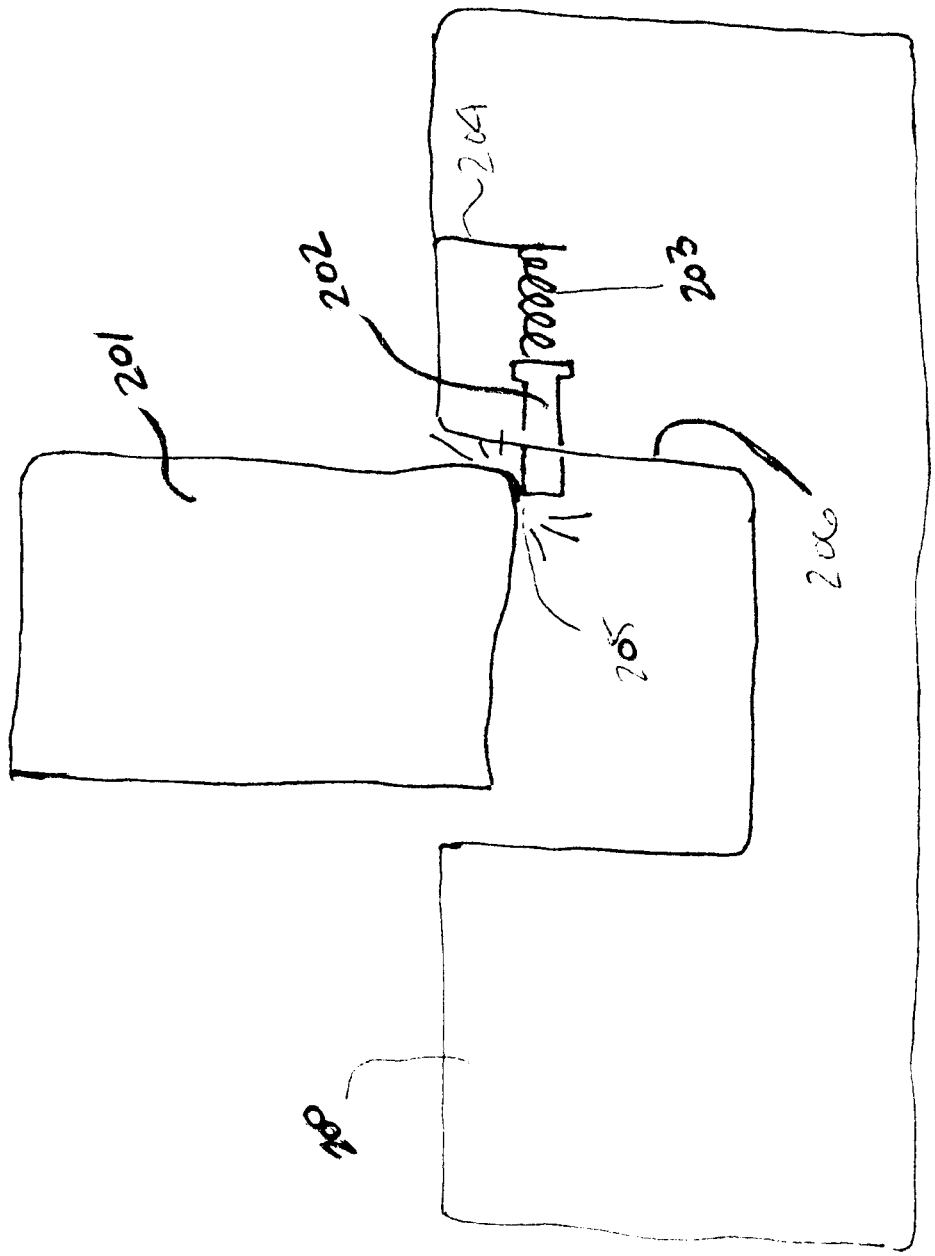
FIG. 2 is a prior art charger.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 3:
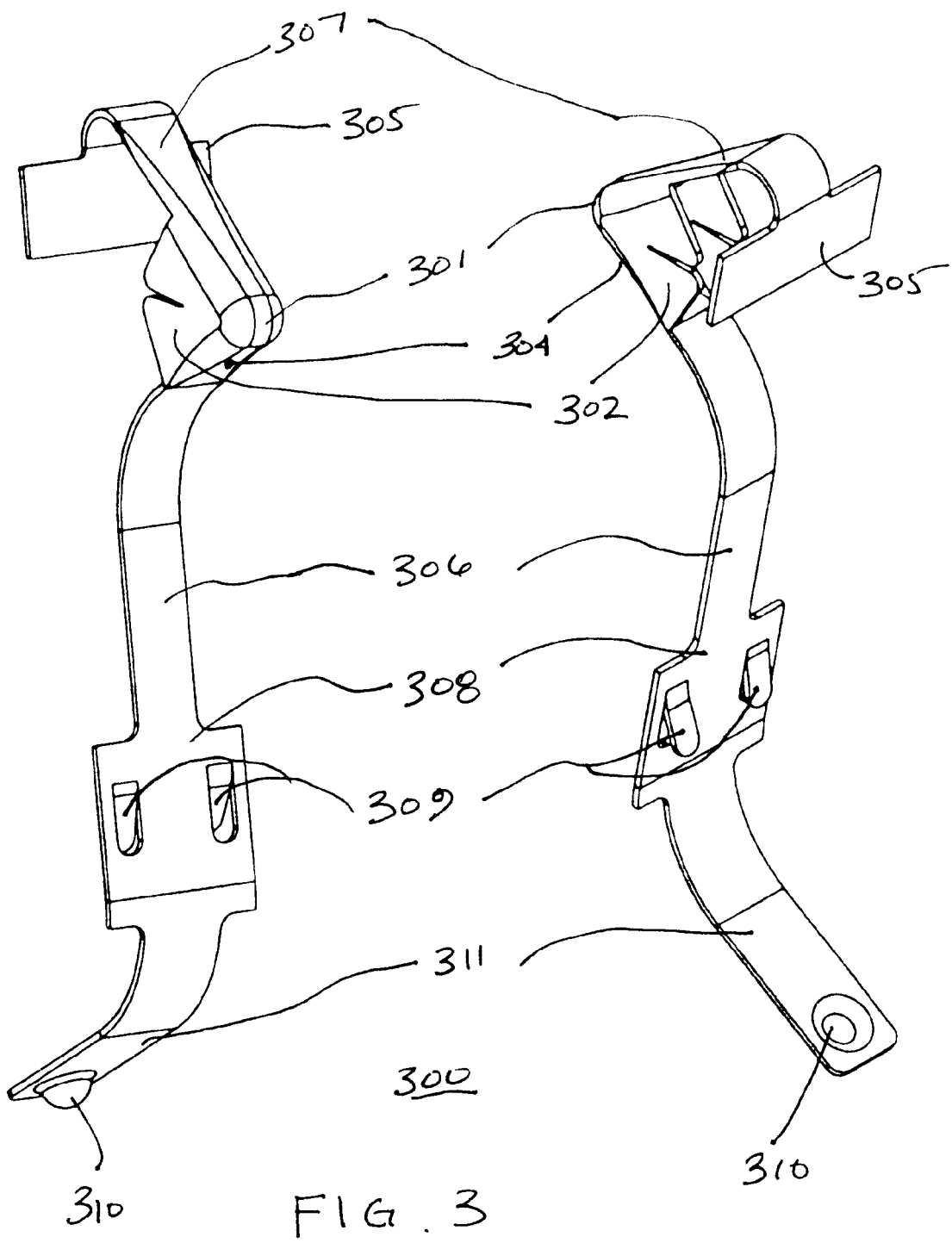
FIG. 3 is a preferred embodiment of a contact in accordance with the invention.

Referring now to FIG. 3, illustrated therein is an electrically-conductive contact 300 in accordance with the invention. The contact 300 is preferably constructed from a springy metal like, for example, stainless steel. The contact 300 is preferably manufactured by a stamping process known as a progressive die method.

The contact 300 includes several features that allow the contact 300 to address the problems noted above. First and foremost, the contact 300 includes a convex, triangular shaped contour 301 for making contact with the electrical contact on a battery. The contour 301 resembles a bird's beak in shape. The contour 301 includes four metal flaps 302 that prevent snags when a battery is inserted across the contour 301. The sloping sides of the contour 303,304 help the contact 300 to deflect when batteries are inserted across the contour 301.

A mechanical stop 305 is provided to prevent the contact 303 from hyper-extending through a battery charger plastic wall during insertion. The action of the mechanical stop 305 is described in further detail below. The mechanical stop 306 is wider than the stem 306 of the contact 300. The difference in widths allows the stem 306 and contour 301 to pass through a battery charger pocket sidewall aperture only a predetermined amount. The predetermined amount is determined by the mechanical stop extensor 307.

The stem 306 is curved during manufacture so as to provide a preload force against the wall of the charger pocket. The pre-load force pushes the stem 306 against the charger pocket wall for increased stability. The preload force also ensures proper electrical contact between the stem 306 and the electrical contact on a radio.

The contact 300 includes charger mount 308 having at least one lanced barb 309. The charger mount 308 may be inserted between two plastic retention walls inside the charger. The lanced barb 309 intersects with the wall to hold the contact 300 in place within the charger. Note that the lanced barb 309 is projecting away from the contour. This is intentional, in that the lanced barb counters the insertion force from a battery that operates upon upper sloping side 303. For added height adjustability, mating notches may be included in the plastic retention walls inside the charger.

A terminal mating protrusion 310 is included to mate with an electrical pad on a printed circuit board. The protrusion 301 is supported by a protrusion extensor 311. The protrusion extensor 311 flexes into a preloaded position by way of the lanced barb 311. By way of example, in one preferred embodiment, the contact 300 is inserted in to an upper half of a battery charger housing, with the lanced barb 309 securing the contact 300 in the upper half. This upper half is then mated to a lower half having a printed circuit board. When the halves are put together, the circuit board pushes against the protrusion 310, thereby flexing the protrusion extensor 311 into a preloaded position.

Figure 4:
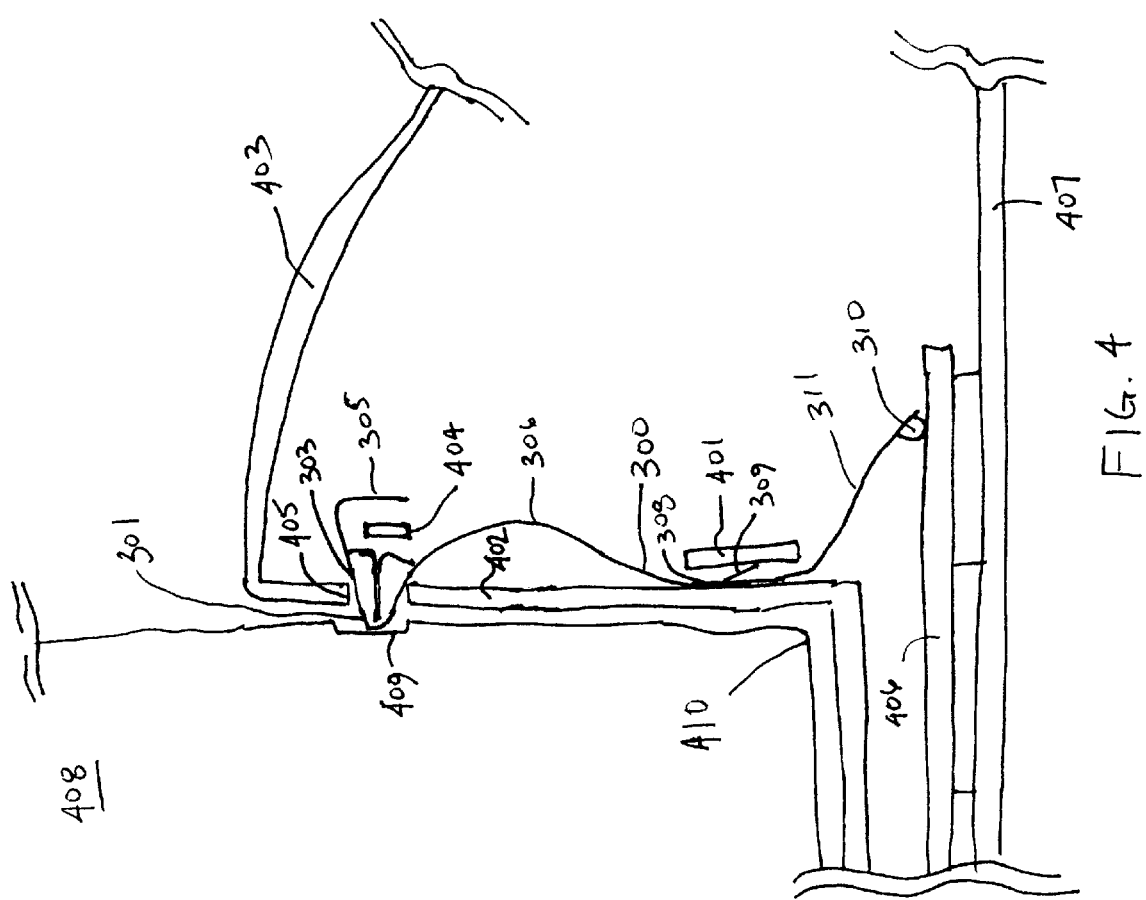
FIG. 4 is a charger having a contact in accordance with the invention.

Referring now to FIG. 4, illustrated therein is one preferred embodiment of a contact disposed in a charger housing in accordance with the invention. FIG. 4 is a cross-sectional view. The contact 300 is situated between two rigid walls 401,402 that are integrated into the upper housing of 403 of a battery charger. An optional third wall 404 may be included to prevent the contour 301 from passing more than a predetermined amount through the battery pocket sidewall aperture 405. The third wall 404 engages the mechanical stop 305, thereby preventing unwanted exposure of the contour 301 through the aperture 405. In the absence of the third wall 404, the mechanical stop engages the battery pocket sidewall 402 when no battery is in the pocket.

The stem pre-loads the mechanical stop 305 against its engaging member (either the third wall 404 if used, or if no third wall, the battery pocket sidewall 405). The contact 300 is held in place by the lanced barb 309, which engages a retaining wall 401, thereby pressing the charger mount 308 against the charger pocket sidewall 402. As the lanced barb 309 physically invades the retaining wall 401, the contact is held securely in place without adhesives, rivets, screws or welds.

The protrusion extensor 311 preloads the terminal mating protrusion 310 against an electrically conductive pad located on a printed circuit board 406. The printed circuit board is seated in the bottom housing 407 of the charger. The preload of the protrusion extensor 311 is created when the upper housing 403 and lower housing 407 are coupled together.

The battery 408 of FIG. 4 has a relatively shallow contact terminal 409. When the battery 408 is inserted, the bottom corner 410 of the battery engages the top sloping side 303 of the contour 301. This engagement causes the stem 306 to deflect, wherein the contour 301 moves back into the upper housing 403. The spring action of the stem 306 ensures a proper electrical connection with the contact terminal 409.

Figure 5:
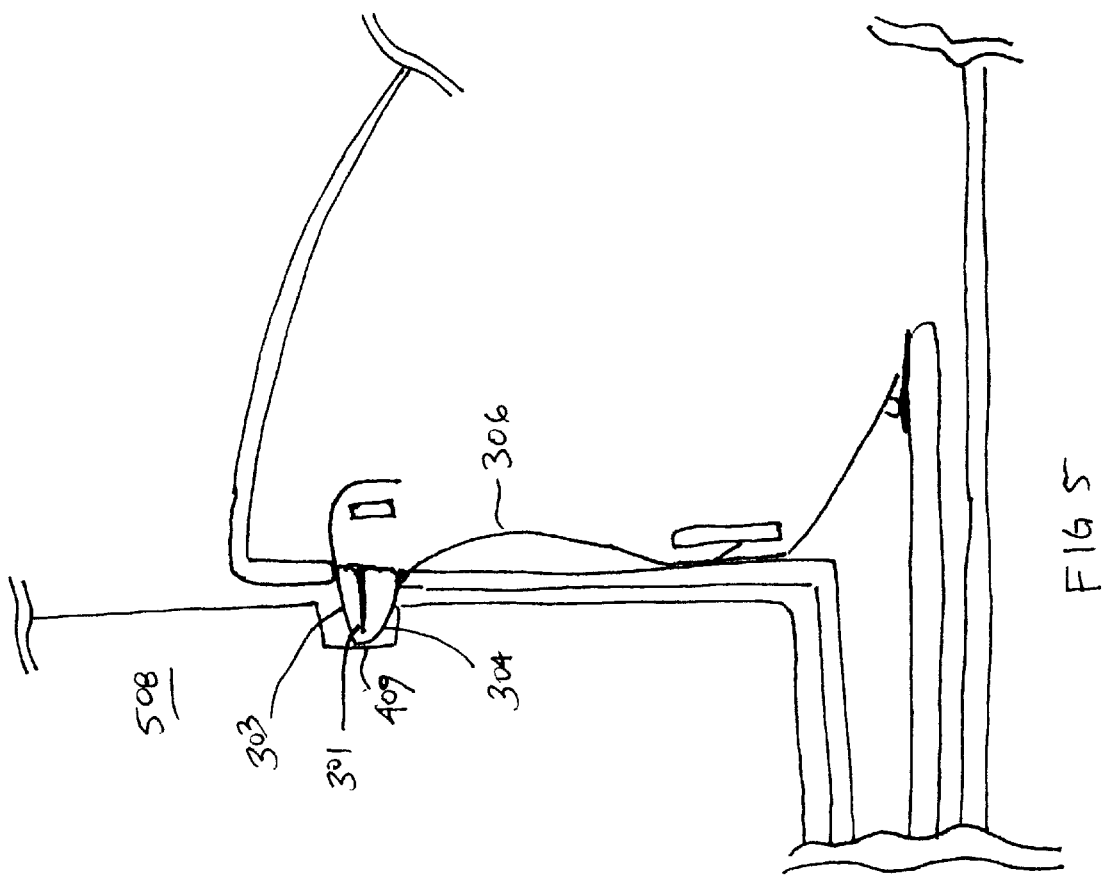
FIG. 5 is a charger accommodating an alternate battery, the charger having a contact in accordance with the invention.

Referring now to FIG. 5, illustrated therein is charger-contact embodiment of FIG. 4. However, in FIG. 5, the battery 508 includes a relatively deep contact terminal 409. FIG. 5 illustrates how the sloping sides 303,304 of the contour 301, combined with the spring action of the stem 306, allow the contour 301 to mate with contact terminals, e.g. 409, of varying depths.

Figure 6:
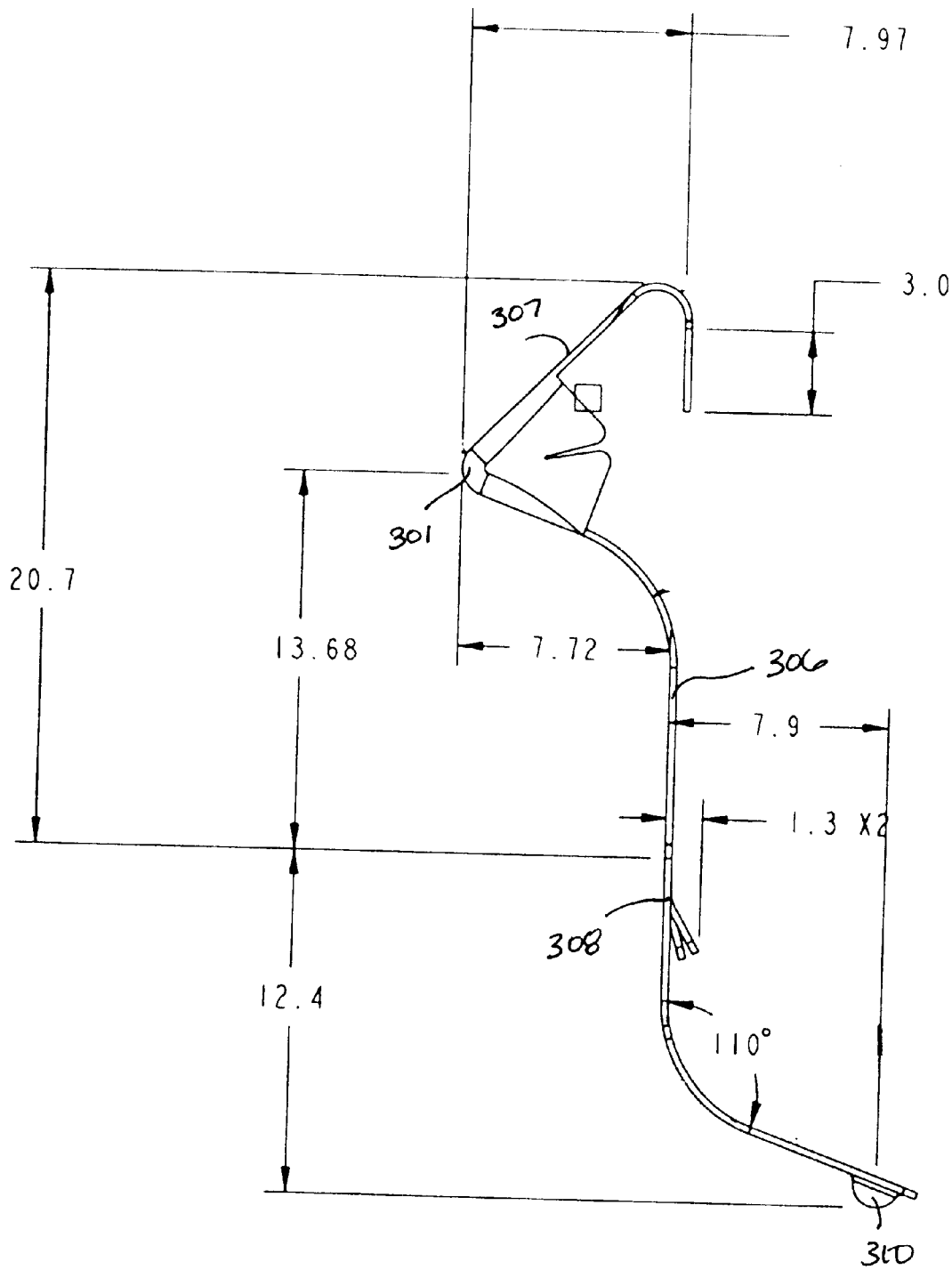
FIG. 6 is one preferred embodiment of a contact in accordance with the invention, including preferred dimensions for coupling to a plurality of electrical contacts.

As discussed with respect to FIGS. 4 and 5, the contact is capable of mating with contact terminals of varying depths on a battery or electronic device. The depths of these contact terminals range from a flush mount to as much as 8 mm below the surface of the battery. To accommodate such a wide range of electrical contact depths with robust reliability, certain dimensions of the contact are preferred. One such set of preferred dimensions are shown in FIG. 6. While dimensions other than those shown in FIG. 6 will work equally well, experimental results have shown that the dimensions of FIG. 6 accommodate the range of battery contact terminal depths from flush mount to 6 mm below the surface.

The distance from the top of the mechanical stop extensor 307 to the charger mount 308 ranges from 15 to 30 mm, and is preferably between 20 and 21 mm. The distance from the contour 301 to the charger mount ranges from 7 to 20 mm, and is preferably between 13 and 14 mm. The distance from the top of the charger mount 308 to the protrusion ranges from 6 to 18 mm, and is preferably between 12 ad 13 mm. The distance from the contour 301 to the stem ranges from 4 to 10 mm, and is preferably between 7 and 8 mm.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while one preferred embodiment has been directed to a contact for a battery charger, the contact could be used for other applications, like forming an electrical connection between two printed circuit boards.

What is claimed is:

1. An electrically conductive contact, comprising:
   a. a convex contour;
   b. a mechanical stop extensor coupled to the convex contour;
   c. a mechanical stop coupled to the mechanical stop extensor;
   d. a stem coupled to the convex contour;
   e. a charger mount coupled to the stem;
   f. a protrusion extensor coupled to the charger mount; and
   g. a protrusion coupled to the protrusion extensor.

2. The contact of claim 1, wherein the convex contour comprises at least a first and a second sloping side.

3. The contact of claim 2, wherein the convex contour further comprises a plurality of metal flanges.

4. The contact of claim 3, wherein the distance from the mechanical stop extensor to the charger mount is between 15 and 30 mm.

5. The contact of claim 3, wherein the distance from the convex contour to the charger mount is between 7 and 20 mm.

6. The contact of claim 3, wherein the distance from the charger mount to the protrusion is between 6 and 18 mm.

7. The contact of claim 3, wherein the distance from the convex contour to the stem is between 4 and 10 mm.

8. The contact of claim 3, wherein the contact is manufactured from a springy metal material.

9. The contact of claim 8, wherein the convex contour is triangular in shape.

10. The contact of claim 9, wherein the contact is manufactured from stainless steel.

11. The contact of claim 10, wherein the contact is manufactured from a progressive die process.

12. A battery charger comprising the contact of claim 1.

13. The charger of claim 12, wherein the stem is formed so as to preload the mechanical stop against a retaining wall when the contact is mounted in the charger.

* * * * *